United States Patent [19]
Parisien

[11] 4,124,322
[45] Nov. 7, 1978

[54] CORNER FASTENER
[76] Inventor: Rudolph E. Parisien, 891 Rainbow St., Ottawa, Canada
[21] Appl. No.: 781,311
[22] Filed: Mar. 25, 1977
[30] Foreign Application Priority Data
Apr. 28, 1976 [CA] Canada .................................. 251327
[51] Int. Cl.² ............................................. F16B 13/10
[52] U.S. Cl. .................................. 403/295; 403/297; 403/401; 52/656; 160/381; 40/152
[58] Field of Search .............. 403/295, 297, 401, 402, 403/405, 339, 340; 52/656, 657, 574, 288; 160/381; 40/152, 125 H

[56] References Cited
U.S. PATENT DOCUMENTS

| | | | |
|---|---|---|---|
| 3,290,076 | 12/1966 | LeTarte | 403/295 |
| 3,456,973 | 7/1969 | Peter | 403/295 |
| 3,822,101 | 7/1974 | Schneider | 403/295 |

FOREIGN PATENT DOCUMENTS
1,906,014  8/1969  Fed. Rep. of Germany ........... 403/297

*Primary Examiner*—Wayne L. Shedd
*Attorney, Agent, or Firm*—A. W. Breiner

[57] ABSTRACT

A corner key for securing channel members to form a frame, such as a gate frame which consists of two substantially identical mating members. Each of the members is in the form of two identical sections joined substantially at right angle to each other. There is at least one transverse groove on the face of each section which will mate with the other member so that when the mating faces of the identical members of the key are placed face to face apertures are provided in the corner key. These apertures are adapted to receive fastening means which tend to wedge the members apart thus creating a tighter fit in the channel member.

3 Claims, 5 Drawing Figures

CORNER FASTENER

This invention relates to fastening devices and more particularly to a corner key for securing mitered ends of tubular members together so as to construct a gate frame or the like.

Known corner keys for use in the constructing gate frames include channel members of U shaped cross section provided with a right angle bend and solid extruded right angle members. Both of these known corner keys suffer from disadvantages. The channel type key tends to lack the necessary rigidity to prevent twisting of the gate frame and fails to facilitate the use of hinge pins adapted to extend through vertical holes in the corner key which is possible when using a solid key.

On the other hand the extrusions, while providing more strength, must be drilled to provide for the installation of hinge pins, latch pins and the like.

Furthermore both of the above types of corner keys cannot be manufactured to the exact tolerances required for a tight fit within the channel members of the gate frame. Thus tolerances of ± 10 thousandths of an inch on the corner key and a tolerance of ± 10 thousandths of an inch on the gate frame members could result in 20 thousands of an inch between the corner key and the walls of the frame member thereby allowing the gate frame to twist and loosen at the joints.

It is therefore an object of the present invention to provide a corner key comprising two right angle members having transverse grooves in their mating faces whereby bolts, screws or the like extending through the wall of the gate frame and into the bore formed by the grooves tend to spread the right angle members apart thereby providing a tighter fit.

A further object of the present invention is the provision of pre formed apertures in the corner key thereby eliminating time consuming drilling.

Accordingly the present invention provides a corner key for use in securing channel members together to form a frame, said corner key comprising a pair of mating substantially identical members each said member having two sections jointed at their ends to form a corner key and at least one transverse groove in one mating face of each of the sections so that when said mating identical members are placed face to face apertures are provided in said corner key.

In the drawings which illustrate embodiments of the invention:

Figure 1:
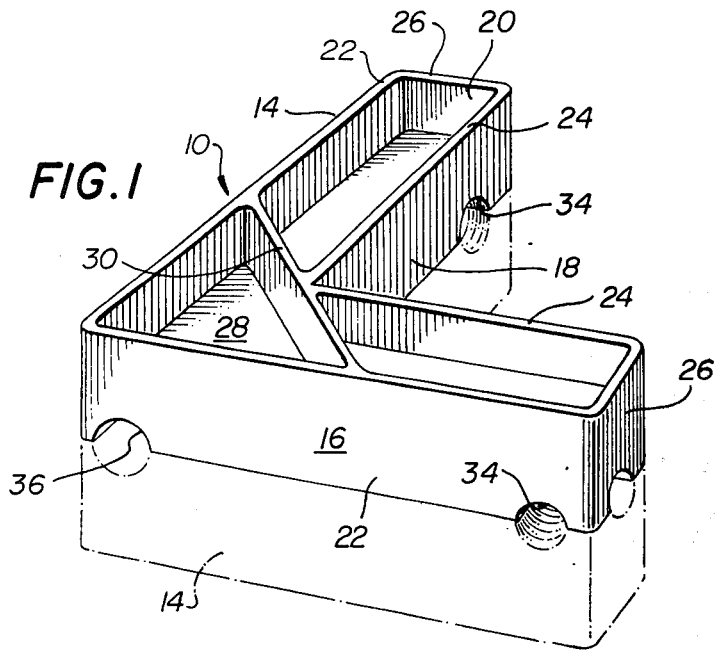
FIG. 1 is a perspective view of one of the two identical members which make up the corner key.
Figure 2:
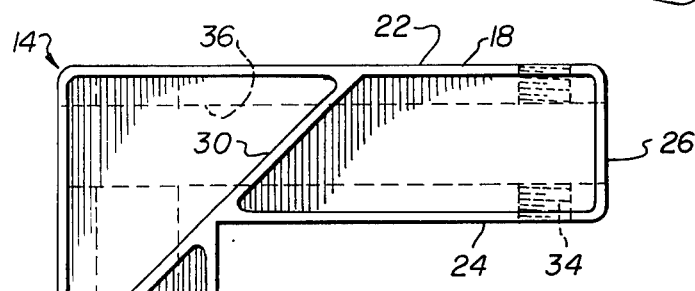
FIG. 2 is a top plan view of the member of FIG. 1.
Figure 2:
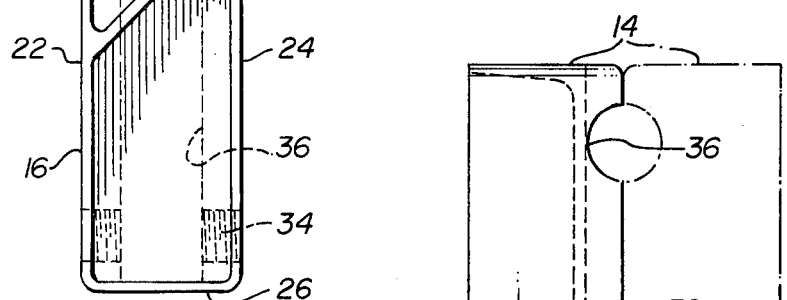
Figure 3:
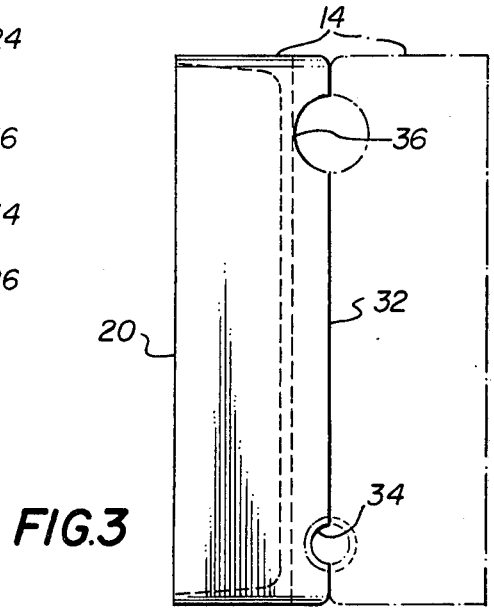
FIG. 3 is a side elevational view of the member of FIG. 1 showing an additional member in broken lines.
Figure 5:
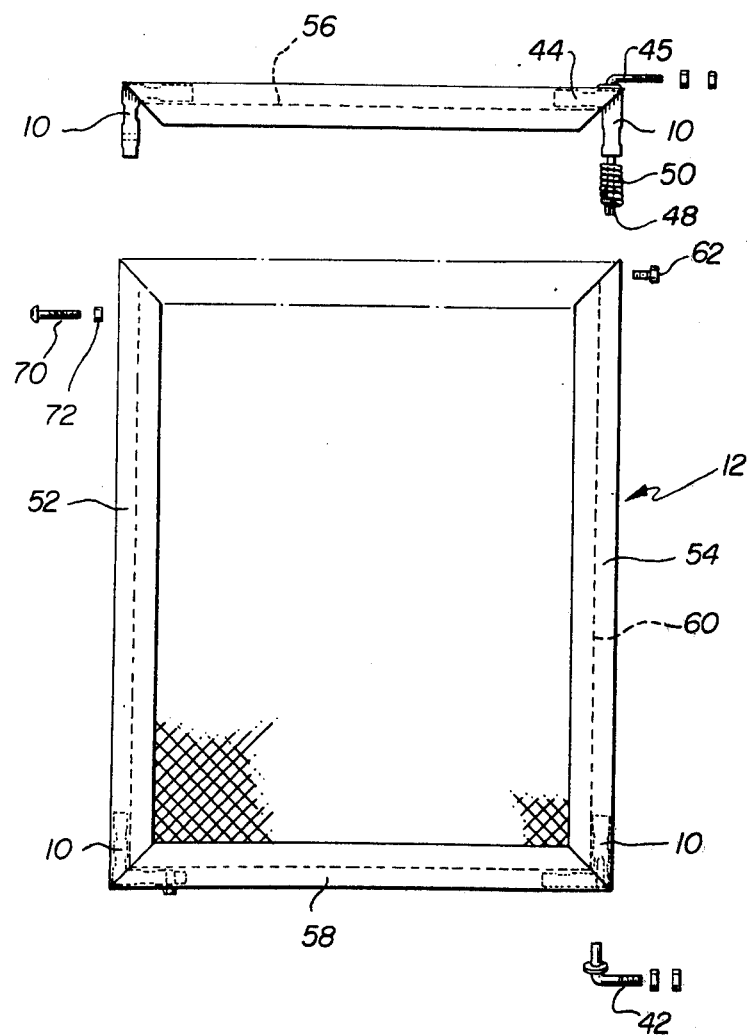
FIG. 5 is an exploded view of a gate frame.

Referring now in detail to the drawings corner keys 10 are shown generally in FIG. 5 in position on a gate 12. The corner key 10 comprises a pair of mating substantially identical members 14 as shown more clearly in FIGS. 1, 2 and 3. These members 14 are preferrably moulded or stamped using a suitable metal.

The member 14 includes two sections 16 and 18 integrally joined at right angles. In the preferred embodiment an outer side 20 of the member 14 is concave so as to save material and decrease its weight. Each section 16 and 18 has two side walls 22 and 24, end walls 26 and a bottom wall 28. The adjacent ends of the side walls 22 are joined together as are the adjacent ends of the side walls 24. In order to provide greater rigidity a partition wall 30 is provided between the mid portion of one of the walls 22 and the midportion of the other one of the walls 22. The partition wall is also secured to the walls 24 where the walls 24 are joined together. On the major or mating face 32 of the bottom wall 28 of each member 14 a transverse groove 34 is provided equidistant from the end of each section 16 and 18. The groove 34 is preferably slightly less than semi cylindrical (for reasons to be explained below) and is threaded but could be shaped to receive a self tapping screw, a tapered wedge pin or the like. However, if fastening means other than a threaded bolt is to be inserted in the bore formed by transverse grooves in two mating members 14 the groove could be any suitable shape such as square, oval or hexagonal.

Figure 4:
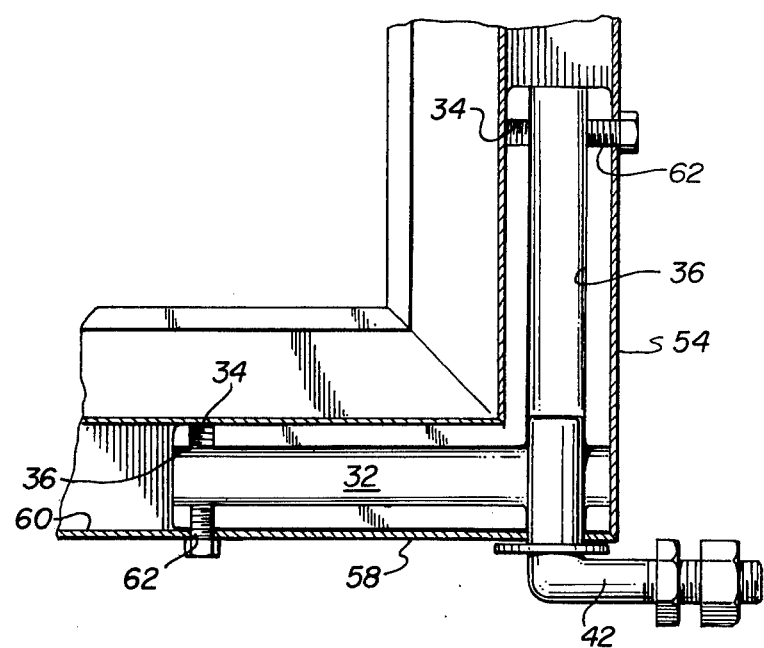
FIG. 4 is a sectional side elevational view of a gate corner and corner key.

In addition to the transverse, the grooves 34 longitudinal semi cylindrical grooves 36 extend the entire length of the mating face of each of the sections 16 and 18. The purpose of these grooves 36 will be more readily understood with reference to FIGS. 4 and 5 wherein hinge pins 42 and 45 extend through the grooves 36 of the mating members 14 of the corner key 10. The hinge pin 42 supports the gate 12 whereas the hinge pin 45 carries a coil spring 50 thus providing a spring actuated gate closer described more fully in my co-pending application No. 240,806 filed on Dec. 1, 1975 in the Canadian Patent Office.

It should be pointed out that since the sections 16 and 18 of each member 14 are as identical as possible and the transverse grooves 34 extend across the mating face of the member 14 so as to be parallel to the end walls thereof, it is possible to use one mould to produce the mating members 14 since the identical members can be arranged so that the grooves 34 and 36 will be in alignment. However, with regard to the threads provided the transverse grooves 34 in adjoining sections 16 and 18 are identical except that one section has the threads advanced one half turn. This is necessary so that when two members 14 have their mating faces together the transverse grooves 34 in both mating faces will provide a continuous thread to receive a bolt.

The corner key 10 described herein is for use in the gate 12 shown in FIG. 5 which has side members 52 and 54, a top member 56 and a bottom 58 in the form of channel members having a box section 60 to receive the corner keys 10.

The corner keys 10 are inserted into the mitered ends of the gate frame members 52, 54, 56 and 58 as shown in FIG. 5 and bolts 62 are then inserted into the apertures formed by the transverse grooves 34 through aligned apertures provided in the gate members.

It will be noted that the transverse grooves 34 also provide a suitable threaded bore for a latch pin 70 since there is no hinge pin 42 or 45 on the gate member 52 the latch pin 70 can extend the entire length of the transverse groove 34. A lock nut 72 is provided on the latch pin 70 in the usual manner.

The embodiments of the invention in which an exclusive property or privilege is claimed are defined as follows:

1. A corner key for use in securing channel members together to form a frame, said corner key comprising a pair of mating substantially identical members, each said member having two sections joined at their ends to form an L-shaped corner key, at least one transverse groove in a mating face of each of the sections adjacent an end thereof so that when mating identical members are placed face to face said grooves provide threaded transverse apertures which are less than cylindrical, whereby cylindrical threaded bolts inserted in said apertures cause said members to be urged apart, one said transverse groove in one section of said member having a thread which is one-half turn ahead of the thread in said groove of said other section of said member so that mating threaded grooves will provide a threaded aperture to receive said bolt.

2. A corner key as claimed in claim 1 wherein a longitudinal groove in the face of each said section extends the entire length of each said section.

3. A corner key as claimed in claim 1 wherein each said section has two side walls, an end wall and a bottom wall, said side walls of each section being connected at their ends to form a right angular box having substantially semi-cylindrical longitudinal and transverse grooves in said outer face of said bottom wall.

* * * * *